US010121169B2

(12) United States Patent
Liu et al.

(10) Patent No.: US 10,121,169 B2
(45) Date of Patent: Nov. 6, 2018

(54) TABLE LEVEL DISTRIBUTED DATABASE SYSTEM FOR BIG DATA STORAGE AND QUERY

(71) Applicant: Amobee, Inc., Redwood City, CA (US)

(72) Inventors: Shaosu Liu, Daly City, CA (US); Bin Song, Fremont, CA (US); Khaled Elmeleegy, Sunnyvale, CA (US); Sriharsha Gangam, Phoenix, AZ (US)

(73) Assignee: Amobee, Inc., Redwood City, CA (US)

( * ) Notice: Subject to any disclaimer, the term of this patent is extended or adjusted under 35 U.S.C. 154(b) by 391 days.

(21) Appl. No.: 14/856,215

(22) Filed: Sep. 16, 2015

(65) Prior Publication Data
US 2017/0075965 A1  Mar. 16, 2017

(51) Int. Cl.
*G06F 17/30* (2006.01)
*G06Q 30/02* (2012.01)

(52) U.S. Cl.
CPC ..... *G06Q 30/0277* (2013.01); *G06F 17/3038* (2013.01); *G06F 17/30575* (2013.01); *G06Q 30/0275* (2013.01)

(58) Field of Classification Search
CPC ............ G06Q 30/0277; G06Q 30/0275; G06F 17/3038; G06F 17/30575
See application file for complete search history.

(56) References Cited

U.S. PATENT DOCUMENTS

| | | | | |
|---|---|---|---|---|
| 6,728,352 | B1 * | 4/2004 | Phillips | H04M 15/00 379/112.01 |
| 2009/0006313 | A1 * | 1/2009 | Liu | G06Q 30/02 |
| 2010/0217931 | A1 * | 8/2010 | Beaman | G06F 11/1471 711/114 |
| 2011/0078385 | A1 * | 3/2011 | Lev | G06F 9/467 711/147 |
| 2011/0258482 | A1 * | 10/2011 | Nightingale | G06F 11/1662 714/4.1 |
| 2012/0311581 | A1 * | 12/2012 | Balmin | G06F 9/5066 718/100 |
| 2014/0280032 | A1 * | 9/2014 | Kornacker | G06F 17/30545 707/718 |
| 2016/0092546 | A1 * | 3/2016 | Shivarudraiah | G06Q 10/00 707/600 |

* cited by examiner

*Primary Examiner* — Mark D Featherstone
*Assistant Examiner* — Faezeh Forouharnejad
(74) *Attorney, Agent, or Firm* — Kwan & Olynick LLP

(57) ABSTRACT

A method of managing on-line user data in a table-level distributed database system is disclosed. At a loading interface, a load request from a client device specifying a new or updated data table, which has been populated in a distributed file system, is received. The load request also specifies a location in the distributed file system and a schema of the data table. The loading interface creates new records in a metadata store, and each new record specifies a mapping between the data table and a particular instance that is to load such data table. Each record also specifies the location and schema for such data table. Based on the new records, each instance also loads the data table. Each instance publishes, in the metadata store, load status specifying that loading of the data table is complete so that such data table can be queried by a query client.

20 Claims, 8 Drawing Sheets

400

| Table Name | Location | Schema | Metrics | Shard | Version | Instance ID | Load Status | Del |
|---|---|---|---|---|---|---|---|---|
| Table_1 | Loc1 | S1 | M1 | 0 | 1 | 206a | Resource | Y |
| Table_X | Loc2 | S1 | M2 | 2 | 5 | 206a | - | N |
| Table_X | LocA | S3 | M3 | 0 | 5 3 | 206b | Resource | N |
| . | . | . | . | . | . | . | . | . |
| Table_n | Loc50 | . | Mn | . | . | . | . | . |

| Instance ID | Metrics |
|---|---|
| 206a | Size1, CPU1 |
| 206a | Size2, CPU2 |
| 206b | . |
| . | . |
| . | . |

| Cache Type | Instance ID | Table Name | Metrics | Shard | Version | Loaded |
|---|---|---|---|---|---|---|
| Type1 | 206a | Table_1 | t1 | 0 | 1 | - |
| Type1 | 206a | Table_X | t2 | 2 | 5 | Resource |
| TypeX | 206b | Table_X | t3 | 0 | 5 3 | - |
| . | . | . | . | . | . | . |
| . | . | Table_n | tn | . | . | . |

*Figure 4C*

TABLE LEVEL DISTRIBUTED DATABASE SYSTEM FOR BIG DATA STORAGE AND QUERY

TECHNICAL FIELD OF THE INVENTION

The present invention relates to on-line advertising, and more specifically to managing user and performance data associated with online advertising, as well as other types of data.

BACKGROUND

In online advertising, internet users are presented with advertisements as they browse the internet using a web browser. Online advertising is an efficient way for advertisers to convey advertising information to potential purchasers of goods and services. It is also an efficient tool for non-profit/political organizations to increase the awareness in a target group of people. The presentation of an advertisement to a single internet user is referred to as an ad impression.

Billions of display ad impressions are purchased on a daily basis through public auctions hosted by real time bidding (RTB) exchanges. In many instances, a decision by an advertiser regarding whether to submit a bid for a selected RTB ad request is made in milliseconds. Advertisers often try to buy a set of ad impressions to reach as many targeted users as possible given one or more budget restrictions. Advertisers may seek an advertiser-specific action from advertisement viewers. For instance, an advertiser may seek to have an advertisement viewer purchase a product, fill out a form, sign up for e-mails, and/or perform some other type of action. An action desired by the advertiser may also be referred to as a conversion.

For facilitating on-line advertisement, large amounts of user data for on-line activity are collected and updated for behavior analysis to target users who are more likely to perform specific actions, such as conversions. This user data can also be analyzed for other purposes, besides on-line advertisement. Regardless of application, there is a continuing need for improved techniques and systems for managing and updating large data batches, as well as facilitating efficient queries for such updated data.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A table-level database system for managing on-line user data is disclosed. The system includes a metadata storage system for holding metadata records and a loading interface for receiving from a client device a plurality of load requests having location and schema information for periodically generated or updated data tables that have been populated in a distributed file system. The loading interface is further configured to store in the metadata storage system, in response to each load request, a metadata record mapping the loading request's schema and location information to identifying information for each one or more selected ones of a plurality of distributed table storage instances into which to upload the data table of such load request. The system further includes storage instances that are each configured for and have buffers for loading each identified one of the data tables that is mapped to identifying information for the storage instance as specified in a specific metadata record into the storage instance from the distributed file system based on periodically obtaining, from the metadata storage system, a location and schema information for each identified one of the data tables. Each storage instance is further configured for outputting results via the buffers in response to queries on one or more data tables that are loaded into such storage instances. The system further includes a query interface for receiving, from a client device, client queries on data tables and forwarding such client queries to obtain results from one or more of the storage instances based on metadata records stored in the metadata storage system.

In a specific implementation, each storage instance is further configured to publish load status information for each identified data table to the metadata storage system after such identified data table is loaded into such storage instance, and each client query from a client device pertains to a data table that has corresponding published load status information in the metadata storage system that is accessible by the client device to determine which data table is loaded. In a further aspect, each storage instance is further configured for (i) removing any data tables that are determined by the storage instance to no longer be mapped to such storage instance in the metadata storage system, (ii) unpublishing, at the metadata storage system, load status information for such storage instance and its mapped data tables when such storage instance's stored data tables are unavailable, (iii) republishing any unpublished load status information for such storage instance when the storage instance's stored data tables again become available again after being unavailable and if such stored data tables are determined to be valid.

In another embodiment, each storage instance is a relational database management system (RDMS) instance that supports structured query language (SQL) type queries and is atomicity, consistency, isolation, and durability (ACID) compliant. In another aspect, each metadata record is owned by or assigned to a single one of the storage instances to avoid write conflicts. In another implementation, the location of each identified data table specifies a particular file in the distributed file system. In yet another example, each load request for a data table further specifies a version number for such data table, and the loading interface is configured to store such version number within each metadata record for such data table. In this aspect, the version number is incremented each time a particular data table is updated.

In another example, at least some of the metadata records specify a same data table and different storage instances so as to cause replication of such same data table across such different storage instances. In one aspect, each storage instance is further configured to store status or operational information, including available memory space, for such storage instance in the metadata storage system, and the loading interface is configured to use the status or operational information for each storage instance and a query frequency for each data table so as to determine a replication factor and which storage instances to map to each data table. In another implementation, the query interface and storage instances are configured to receive and respond to queries having a structured query language (SQL) type, transactional, and multi-relation format. In yet another aspect, the query interface is further configured to push a computation for a multi-relation query to a computation server that is outside the table-level distributed database system and to load the computation server's computation results into at least one storage instance from which such query results are obtainable by the query interface for any same multi-relation query that is subsequently received by the query interface. In another example, the query interface is further configured to cause data tables from different storage instances that are specified in a multi-relation query to be consolidated into a particular one of the different storage instances before performing the multi-relation query on such particular storage instance to produce query results that are sent back to any query client that subsequently sends the multi-relation query to the query interface.

In an alternative embodiment, the invention pertains to a method of managing on-line user data in a table-level distributed database system. The method includes (i) at a loading interface of the table-level distributed database system, receiving a load request from a client device specifying a new or updated data table, which has been populated in a distributed file system, to load into the table-level distributed database system, wherein the load request also specifies a location in the distributed file system and a schema of the new or updated data table, (ii) the loading interface creating a plurality of new metadata records in a metadata storage system, wherein the new metadata records each specifies a mapping between the new or updated data table and a particular one of a plurality of storage instances that are to load such new or updated data table, wherein each metadata record for the new or updated data table also specifies the location and schema for such new or updated data table, (iii) each particular one of the storage instances loading the new or updated data table in response to such particular storage instance being mapped to such new or updated data table in a one of the new metadata records, and (iv) each particular storage instance publishing load status information that indicates that loading of the new or updated data table is complete after such new or updated data table's loading is complete so that such new or updated data table can be queried by a query client.

In another embodiment, the method further includes (i) at a query interface of the table-level distributed database system, receiving a query request with respect to the new or updated data table from a query client, (ii) the query interface querying each particular storage instance that is mapped by the new metadata records to such new or updated data table, and (iii) when query results are received by a first one of the queried storage instances, sending the received query results to the query client before receiving query results from any of the other queried storage instances. In another aspect, the method includes (i) removing the new or updated data table by any one of the storage instances if such storage instance determines that the new or updated data table is no longer mapped to such storage instance in the metadata storage system, (ii) unpublishing, at the metadata storage system, load status information for any one of the storage instances and its mapped new or updated data table when it's unavailable at such storage instance, and (iii) republishing any unpublished load status information for the new or updated data table and any one of the storage instances when such storage instance's new or updated data table becomes available again after being unavailable and if such new or updated data table is determined to be valid.

In a further aspect, the new or updated data table is an updated data table, and the method further includes (i) by each storage instance, storing status or operational information, including available memory space, for such storage instance in the metadata storage system and (ii) by the loading interface, using the status or operational information for each storage instance and a query frequency for the updated data table to determine a replication factor for which storage instances to map to the updated data table in the metadata storage system. In one aspect, the query interface and storage instances are configured to support SQL type queries and be atomicity, consistency, isolation, and durability (ACID) compliant. In yet another aspect, the method includes pushing a computation for a multi-relation query to a computation server that is outside the table-level distributed database system and loading the computation server's computation results into at least one storage instance from which such query results are obtainable by the query interface for any same multi-relation query that is subsequently received by the query interface. In another aspect, data tables from different storage instances that are specified in a multi-relation query are consolidated into a particular one of the different storage instances before performing the multi-relation query on such particular storage instance to produce query results that are sent back to any query client that subsequently sends the multi-relation query to the query interface. In another example the new or updated data table is an updated data table, and the load request for the updated data table further specifies a version number for such updated data table. In this aspect, the loading interface stores such version number within each new metadata record for such updated data table.

These and other features of the present invention will be presented in more detail in the following specification of certain embodiments of the invention and the accompanying figures which illustrate by way of example the principles of the invention.

BRIEF DESCRIPTION OF THE DRAWINGS

FIG. 4A represents example records for holding metadata for data tables that are to be loaded in accordance with a specific embodiment of the present invention.

FIG. 4B illustrates metadata for a plurality of instances in accordance with one embodiment of the present invention.

FIG. 4C represents example records for holding metadata for data tables that have been loaded by an instance and are available for queries in accordance with a specific embodiment of the present invention.

DETAILED DESCRIPTION OF THE SPECIFIC EMBODIMENTS

Figure 1:
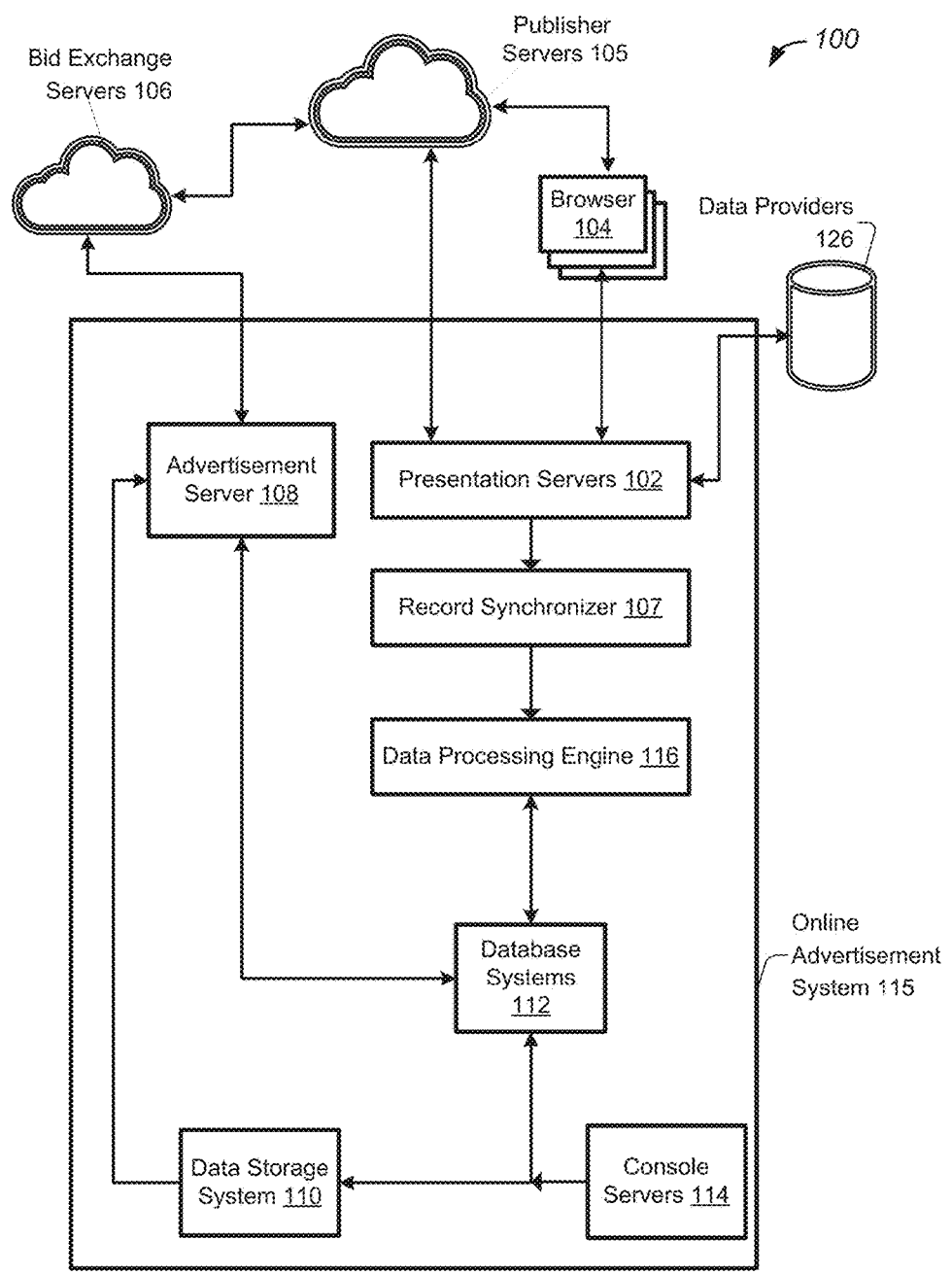
FIG. 1 illustrates a diagram of an example of an advertisement and data management system configured in accordance with some embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction:

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

There are currently many challenges in dealing with big data collection, processing, and storage. In the big data field of user on-line advertisement data, tens of terabytes (or more) are populated every day. For example, a reporting pipeline may populate thousands (20000+) of data tables, each table requiring from 10 MB to 5 GB of disk space. These tables are generated at regular intervals (daily or every few hours). To support latency SLAs (service legal agreements) for front-end applications accessing the data, these tables are preferably accessed from a high performance and available data store.

Certain embodiments of the present invention provide a table level distributed database system, referred to as "Kodiak", for big data applications. This Kodiak system is highly available, self-healing and horizontally scalable. In addition to query operations, this system can support aggregation and join operations on the tables. Certain Kodiak system embodiments can asynchronously load several thousands of cache tables in parallel from a file system within 10 minutes. A 60% speed up of loading performance has been observed with this table level distributed database system, as compared with a relational database management systems (RDBMS) available from Oracle Corp. of Redwood Shores, Calif.

Example on-Line Advertisement Systems:

Although certain embodiments of a table-level distributed Kodiak database system are described below in the context of an on-line advertisement system, other types of big data applications may also utilize such database system. One example advertisement system will now be described.

FIG. 1 illustrates a diagram of an example of an advertisement system 100 configured in accordance with some embodiments. In various embodiments, system 100 may include online advertisement and data management system 115, which may be used by an online advertisement service provider to provide advertisement services to one or more entities, such as advertisers.

The online advertisement and data management system 115 may work with any number of external servers, such as publisher servers 105 that provide any suitable type of displayable, executable, audible, or visual media content to users/audience via a user's physical device or on the publisher's device or system. For example, media content may include videos, music, text, games, etc. The content may also pertain to various categories, such as news, entertainment, educational, finance, sports, travel, etc. In a specific implementation, publishers provide media content, such as web pages, from server devices to client devices that are accessible by audience members/users. Example client devices include tablet computing devices, laptop computing devices, personal digital assistant (PDA) devices, mobile phones (e.g., smart phones), desktop computer, televisions, wearable computers, household devices, etc. Each client device may be configured with any suitable hardware and/or software (e.g., browsers and browser add-ins plug-ins, operating systems for downloading and execution of apps on mobile devices) that operate in cooperation with the publisher devices/systems for receiving and presenting media content.

Prior to providing requested media content to users, the publishers 105 may also sell ad spaces with respect to such media content. Advertisers at the demand side have ads to place with publisher-provided media content. For instance, an advertiser pays to have an ad placed in an ad space of a particular web page that is sold by a publisher. An ad space may be available on web pages and other types of media, such as mobile device apps, games, coupons, videos, etc.

The publisher servers 105 may be configured to generate bid requests, which are forwarded to advertisement servers 108. In response to the bid requests, advertisement servers 108 generate one or more bid requests based on various advertisement campaign criteria. Additionally, one or more of the advertisement servers 108 may form part of online advertisement and data management system 110 or may be external to such system 110. Such bid responses may be transmitted and handled in cooperation with a bid exchange server 106 that selects an optimum bid for transmitting to the sender of the bid request, e.g., one of publisher servers 105.

The bid exchange server 106 generally runs an auction to determine a price of a match between an ad and a web page. In essence, bid exchanges are the markets providing mechanisms for facilitating bidding processes between the demand and supply sides. The ad exchanges may be implemented on any suitable number and type of computing devices.

Advertisement servers 108 may also be configured to store budget data associated with one or more advertisement campaigns, and may be further configured to implement the one or more advertisement campaigns over a designated period of time. In some embodiments, the implementation of the advertisement campaign may include identifying actions or communications channels associated with users targeted by advertisement campaigns, placing bids for impression opportunities, and serving content upon winning a bid. In some embodiments, the content may be advertisement content, such as an Internet advertisement banner, which may be associated with a particular advertisement campaign. The terms "advertisement server" and "advertiser" are used herein generally to describe systems that may include a diverse and complex arrangement of systems and servers that work together to display an advertisement to a user's device. For instance, this system will generally include a plurality of servers and processing nodes for performing different tasks, such as bid management (e.g., advertisement servers 108), bid exchange (e.g., bid exchange servers 106), advertisement and campaign creation, content publication (e.g., publisher servers 105), etc.

Demand side platforms (DSP), such as advertisement server 108, may be generally configured to manage advertising campaigns on behalf of advertisers although some advertisers may also work directly with bid exchange servers. Given a user requesting a particular web page, a DSP is able to find the best ad for the user. The best ad may be selected from the ads managed by the DSP. For each ad selected, various constraints (mostly selected by the advertisers, but some by the ad exchange, the publisher, and the DSP) are met.

Online advertisement and data management system 115 may further include various components, such as one or more presentation servers 102, for managing online data for facilitation of online advertising. According to some embodiments, presentation servers 102 may be configured to aggregate various online advertising data from several data sources, such as data providers 126. The online data may be obtained or accessible as $1^{st}$ and $3^{rd}$ party data from various data suppliers, such as first parties (the advertisers themselves) or third parties (independent data suppliers).

The online advertising data may include live internet data traffic that may be associated with users, as well as variety of supporting tasks. For example, the online advertising data may include one or more data values identifying various impressions, clicks, data collection events, and/or beacon fires that may characterize interactions between users and one or more advertisement campaigns. As discussed herein, such data may also be described as performance data that may form the underlying basis of analyzing a performance of one or more advertisement campaigns. In some embodiments, presentation servers 102 may be front-end servers that may be configured to process a large number of real-Internet users and associated SSL (Secure Socket Layer) handling. The front-end servers may be configured to generate and receive messages to communicate with other servers in system 100. In some embodiments, the front-end servers may be configured to perform logging of events that are periodically collected and sent to additional components of system 100 for further processing.

Presentation servers 102 may be communicatively coupled to one or more data sources such as data providers 126, browser 104, and publisher servers 105. In some embodiments, browser 104 may be an Internet browser that may be running on a client machine associated with a user. Thus, a user may use browser 104 to access the Internet and receive advertisement content via browser 104 from one or more publisher servers 105. Accordingly, various clicks and other actions may be performed by the user via browser 104. Moreover, browser 104 may be configured to generate various online advertising data described above. For example, various cookies, advertisement identifiers, beacon fires, and anonymous user identifiers may be identified by browser 104 based on one or more user actions, and may be transmitted to presentation servers 102 (as well as through publisher servers 105) for further processing.

Various additional data sources may also be communicatively coupled with presentation servers 102 and may also be configured to transmit similar identifiers and online advertising data based on the implementation of one or more advertisement campaigns by various advertisement servers, such as advertisement servers 108. For example, these additional advertisement servers may include bid processing services, which may process bid requests and generate one or more data events associated with providing online advertisement content based on the bid requests. Thus, bid processing services of advertisement servers 106 may be configured to generate data events characterizing the processing of bid requests and implementation of an advertisement campaign. Such bid requests may be transmitted to presentation servers 102.

In various embodiments, online advertisement and data management system 115 may further include record synchronizer 107, which may be configured to receive one or more records from various data sources that characterize the user actions and data events described above. In some embodiments, the records may be log files that include one or more data values characterizing the substance of the user action or data event, such as a click or conversion. The data values may also characterize metadata associated with the user action or data event, such as a timestamp identifying when the user action or data event took place. According to various embodiments, record synchronizer 107 may be further configured to transfer the received records, which may be log files, from various end points, such as presentation servers 102, browsers 104, publishers servers 105, and advertisement servers 108 described above, to a data storage system, such as data storage system 110 or database system 112 described in greater detail below. Accordingly, record synchronizer 107 may be configured to handle the transfer of log files from various end points located at different locations throughout the world to data storage system 110 as well as other components of system 100, such as data processing engine 116 discussed in greater detail below. In some embodiments, record synchronizer 107 may be configured and implemented as a MapReduce system that is configured to implement a MapReduce job to directly communicate with a communications port of each respective endpoint and periodically download new log files.

In various embodiments, online advertisement system 115 may include data processing engine 116 which may be configured to perform any suitable data management, processing, or analyzing tasks on any type and size of data. For instance, data processing engine 116 may include modules for transforming and efficiently storing data received via log synchronizer 107. The data processing engine 116 may also be configured to analyze data for various advertisement purposes, such as campaign performance, audience targeting, reporting etc.

In various embodiments, online advertisement system 115 may also include database system 112 which may be configured to store data generated by data processing engine 116. In some embodiments, database system 112 may be implemented as one or more clusters having one or more nodes. For example, database system 112 may be implemented as a four-node RAC (Real Application Cluster). Two nodes may be configured to process system metadata, and two nodes may be configured to process various online advertisement data, which may be performance data, that may be utilized by data processing engine 116. In various embodiments, database system 112 may be implemented as a scalable database system which may be scaled up to accommodate the large quantities of online advertising data handled by system 100 as further described herein. Additional instances may be generated and added to database system 112 by making configuration changes, but no additional code changes, as further described below. Several embodiments for redundant data warehousing, configured in accordance with one or more embodiments, are further described in U.S. patent application Ser. No. 14/535,577, filed Nov. 7, 2014, which is incorporated herein by reference in its entirety for all purposes.

In various embodiments, such large data processing contexts may involve performance and user data stored across multiple servers and storage devices or systems implementing one or more redundancy mechanisms configured to provide fault tolerance for the performance and user data. In one example context, a reporting pipeline ingests log records attributing to user events such as impressions, clicks and actions as described herein. The pipeline can generate more than 20,000 caches. In one embodiment, these caches are consumed and presented by front-end applications. The pipeline pre-computes these amounting to several terabytes of data every day. The ETL phase of our pipeline does most of the heavy lifting (join and group operations) via mapreduce and pig jobs and stores the pre-computed caches in a data storage system 110, such as a distributed file system.

One example of a distributed file system is the Hadoop Distributed File System (HDFS)®, which includes several Hadoop® clusters specifically configured for processing and computation of the received log files. For example, data storage system 110 may include two Hadoop® clusters where a first cluster is a primary cluster including one primary namenode, one standby namenode, one secondary namenode, one Jobtracker, and one standby Jobtracker. The second node may be utilized for recovery, backup, and time-costing query. Furthermore, data storage system 110 may be implemented in one or more data centers utilizing any suitable multiple redundancy and failover techniques. By way of a specific embodiment, all the modules in Hadoop are designed with a fundamental assumption that hardware failures (of individual machines, or racks of machines) are commonplace and, thus, are automatically handled in software by the framework. The term "Hadoop" has come to refer not just to the base modules above, but also to the "ecosystem", or collection of additional software packages that can be installed on top of or alongside Hadoop, such as Apache Pig, Apache Hive, Apache HBase, Apache Spark, and others. In general, a Hadoop-compatible file system provides location awareness: the name of the rack (more precisely, of the network switch) where a worker node is. Hadoop applications can use this information to run work on the node where the data is, and, failing that, on the same rack/switch, reducing backbone traffic. HDFS uses this method when replicating data to try to keep different copies of the data on different racks. The goal is to reduce the impact of a rack power outage or switch failure, so that even if these events occur, the data may still be readable. Various embodiments disclosed herein may also utilize other frameworks, such as .NET or grid computing.

Ingestion jobs may be scheduled at regular intervals (every few hours or daily) to generate different versions of the cache tables. These caches may be asynchronously loaded into a highly scalable distributed data store, referred to herein as "Kodiak" and/or other data stores.

In various embodiments, database system 112 may be communicatively coupled to console servers 114 which may be configured to execute one or more front-end applications. For example, console servers 114 may be configured to provide application program interface (API) based configuration of advertisements and various other advertisement campaign data objects. Accordingly, an advertiser may interact with and modify one or more advertisement campaign data objects via the console servers. In this way, specific configurations of advertisement campaigns may be received via console servers 114, stored in database system 112, and accessed by advertisement servers 108 which may also be communicatively coupled to database system 112. Moreover, console servers 114 may be configured to receive queries with respect to user or performance data, and may be further configured to generate one or more messages that transmit such queries to other components of system 100.

In various embodiments, the various engines and modules of the advertisement and data management system, such as data processing engine 116 or advertisement servers 108, or any their respective components may include one or more processing devices configured to manage advertising tasks and manage data received from various data sources, such as a data storage system operated and maintained by an online advertisement service provider, such as Turn® Inc., Redwood City, Calif. In some embodiments, such processing devices may each include one or more communications interfaces configured to communicatively couple to other components and entities, such as coupling data processing engine 116 to a data storage system and a record synchronizer. Furthermore, each data processing component may include one or more processing devices specifically configured to process data associated with data events, online users, and websites. In another example, each module or engine may include multiple data processing nodes for processing large amounts of data, such as performance data, in a distributed manner. In one specific embodiment, each module and engine may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. The one or more processors may each include various input and output buffers for efficiently receiving data and outputting processed data, respectively. According to various embodiments, each system component or engine may be implemented as a controller, which may be a hardware controller. Moreover, each system component or engine may be configured to include one or more dedicated processing units that include one or more hardware accelerators configured to perform pipelined data processing operations. For example, operations associated with managing table-level distributed data and queries with respect to same as described below may be handled, at least in part, by one or more hardware accelerators included in database systems 112.

Kodiak Database System Embodiments:

Every day 20,000 or more cache data tables, each ranging from 10 M to 5 G space, are generated and populated. These tables are generated periodically, and certain embodiments of the present invention provide a distributed table-level database system that can efficiently batch load big data tables into distributed data storage. These table-level database embodiments can handle big data, while providing high availability and horizontal scalability. Additionally, these database system embodiments can effectively serve front end queries over big data tables at high performance levels based on management of relatively small sets of metadata records. For example, structured query language (SQL)

queries, including transactional and multi-relation queries such as join and aggregate, are supported.

Figure 2:
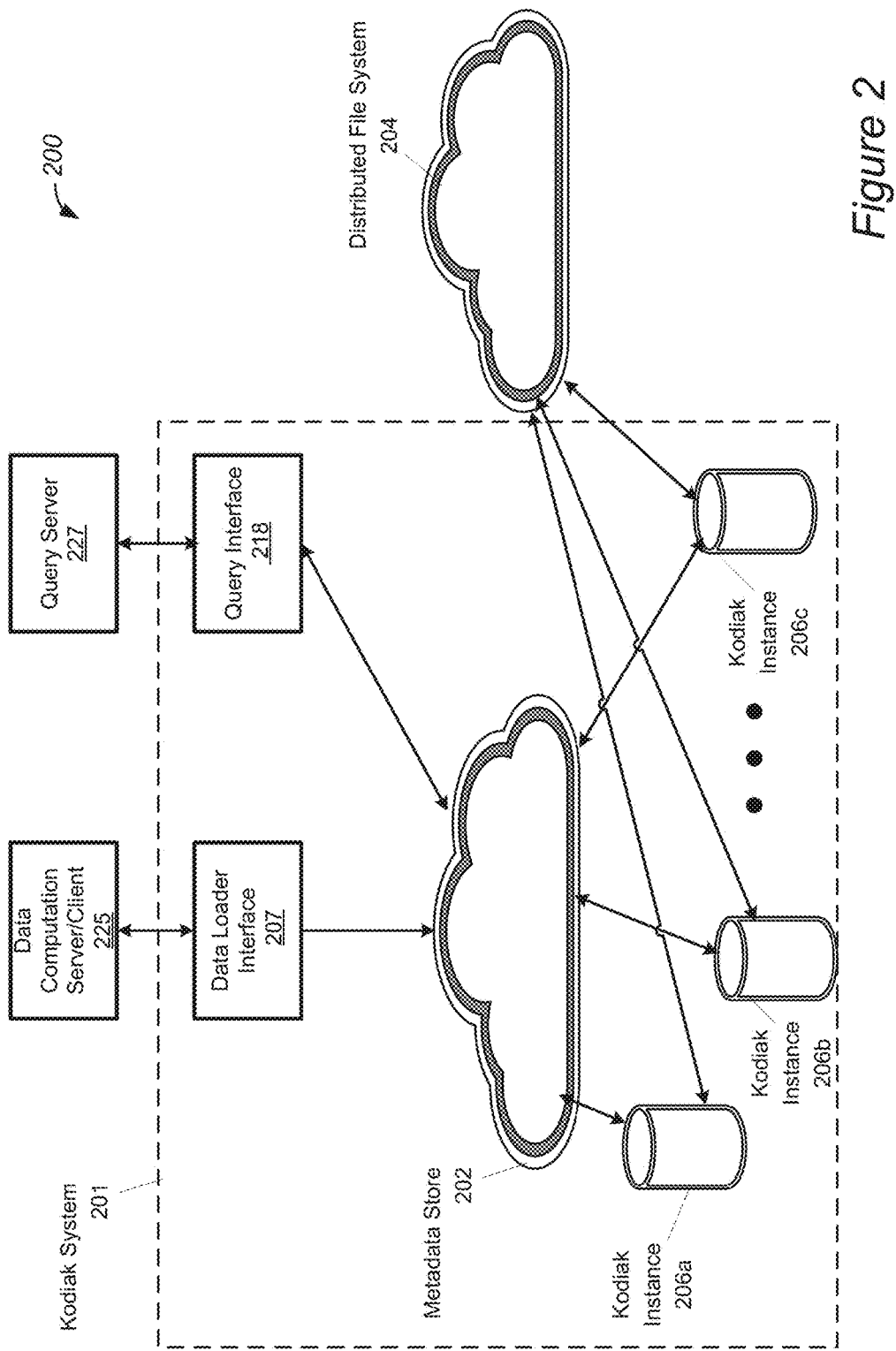
FIG. 2 is a diagrammatic representation of a database system 200 in accordance with one embodiment of the present invention.

FIG. 2 is a diagrammatic representation of a database system 200 in accordance with one embodiment of the present invention. A portion of this database system 200 may be implemented as a table-based database system 201, which is referred to herein as the "Kodiak" system. The Kodiak system 201 may include any suitable number and type of components, including specially-configured servers, file system nodes, database storage devices, by way of examples, each having specially-configured interfaces, such as large and efficient input and output buffers, for quickly inputting and outputting large batches of data. This Kodiak system 201 may also work with other types of database systems of the advertisement system (e.g., 115), such as pipeline data processing and table-generating database systems for ingesting and generating cache data tables.

As shown, the overall database system 200 may include one or more data computation servers 225 for requesting data tables to be loaded into the Kodiak system 201. For instance, a computation server 225 may be the last server in a data ingestion pipeline for ingesting large amounts of user and performance data and generating summary tables based on such ingested data. The one or more data computation servers 225 may also be configured to handle any additional data processing with respect to the data table queries so that such processing can be offloaded from the Kodiak system (as much as possible) as further described below.

The Kodiak system 201 may include a data loading interface 207, such as a loading application programming interface (API), which may be implemented on any suitable component, such as a specifically configured loading server. In general, the data loading interface 207 manages loading requests or updates for data tables. The loading requests may be received from any suitable data loading client, such as computation server 225. That is, any client that wishes to load tables into Kodiak can utilize a Kodiak loading interface, such as a Kodiak API.

After receiving a request to load tables, the data loading interface 207 may then cause the requested or updated data to be automatically loaded into one or more Kodiak instances (e.g., 206a-206c), including replication of such loaded data across multiple instances, by simply generating or creating metadata records in a metadata store 202, by way of example. In general, the metadata records map particular sets of data tables (including each data table's file location, table name, and schema, etc.) to particular Kodiak instance identifiers for specific Kodiak instances. Other metadata may be associated with particular sets of mapped data tables as further described herein.

The metadata store 202 may include any suitable number and type of storage instances, which may be centrally located relative to the other components of the Kodiak system 200, by way of example. The metadata storage may also be implemented in a high availability system, such as Zookeeper as one or more metadata tables in MySQL or the like. Some instance operational or status information, such as disk usage, may be maintained by Zookeeper ephemeral nodes. The metadata may also be stored as multiple replicas for high availability. For example, the multiple replication solution from XtraDB MySQL cluster (which is available from Percona of Durham, N.C.) works well. A write to a Percona cluster is successful only if all writes to all of the live replicas are successful. Alternatively, a weaker form of eventual consistency can be achieved by using the open source Tungsten replicator, which is available from Google of San Francisco, Calif. The replication mechanism for Tungsten is asynchronous. Since Kodiak metadata writes do not conflict with the same "cell", there will not be conflicts and eventual consistency can be achieved.

The Kodiak instances instance(s) may take any suitable physical form and use any suitable database protocol, such as a cluster of relational database management system (RDBMS) instances to store and serve tables and which support SQL queries. By way of examples, MySQL, Cheetah-QL (CQL), Oracle, or PostgresSQL-compatible instances, which support ACID (Atomicity, Consistency, Isolation, Durability) compliant and transactional queries, may be implemented. Each Kodiak instance may include at least two components, by way of example: 1) a local RDBMS instance and 2) a Kodiak agent running on the same machine. In a specific implementation, the Kodiak agent is implemented as a Java process, and MySQL is used as the underlying local RDBMS instance.

Each Kodiak agent may be specially configured to periodically obtain the metadata records, which include location and schema information for data tables that are mapped to identifying information for such Kodiak instance, and such Kodiak instance may then load its mapped data tables from the specified metadata location, for example, in distributed file system (DFS) 204. The DFS may take any suitable format, such as a Hadoop DFS (or HDFS), e.g., data storage system 110.

The metadata store and RDBMS instances are horizontally scalable. In one example, 40 instances may be used to configure RDMS instances, including 3 metadata instances. More instances may easily be added to the Kodiak system. Additionally, each metadata record may be associated with one instance so as to reduce conflicts. For example, each record is owned or assigned to one instance who can update such record, while other instances cannot write to such record.

Each Kodiak instance may also be configured to output results in response to queries on data tables that are loaded into such distributed storage device as further described herein. The Kodiak database system 200 may also include a query interface 218 through which queries may be received from one or more query servers 227.

The query interface 218 obtains results for query servers 227 from one or more of the Kodiak instances based on metadata records stored in the metadata store 202. That is, the query interface 218 (or lookup API) may be used by a query server 227 that receives a query from a query client (not shown) that wishes to query tables loaded in Kodiak. The query interface 218 may also be configured to accept a particular type of cache (optionally version or shard information) to get from the set of Kodiak instance servers holding the table replicas. To mitigate large latencies for lookups, the query interface 218 may also maintain a cache of loaded tables indexed by the cache type. In addition to lookup, Kodiak may also support aggregations and joins on the tables as further described herein.

Each Kodiak instance may also be configured to publish a "loading is complete" indicator for loaded data tables to the metadata store 202 in association with the metadata for such loaded data tables after loading of the data tables is complete. The "loading is complete" indicator may be stored in the metadata store 202 so as to be accessible by a query client device. A query client may then generate a query to data tables that have corresponding published a "loading is complete" indicator to determine which data tables are loaded. Through metadata, a query client may have knowledge of which instances hold which data tables.

Figure 3:
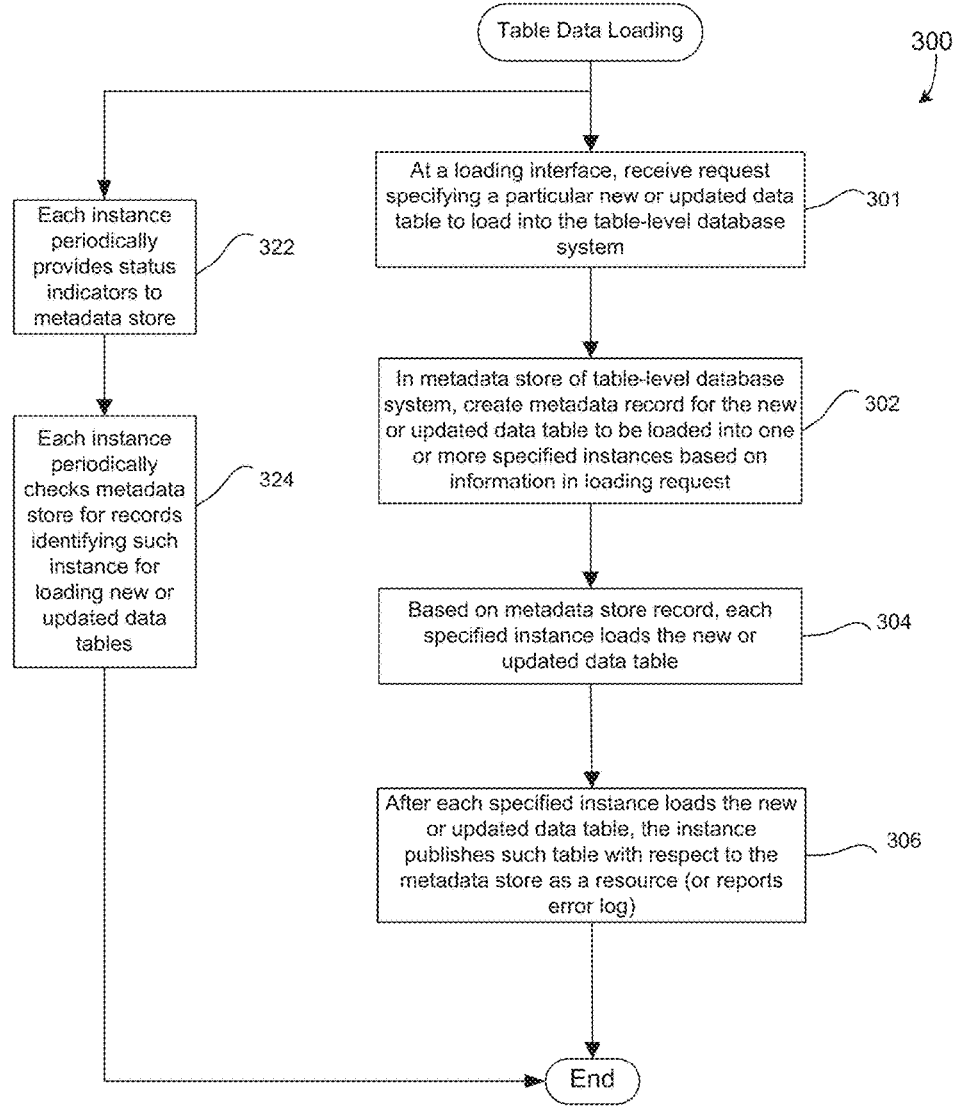
FIG. 3 is a flow chart illustrating a data table loading procedure in accordance with a specific implementation of the present invention.

FIG. 3 is a flow chart illustrating a loading procedure 300 in accordance with a specific implementation of the present invention. For example, such process may be implemented by the Kodiak system of FIG. 2. Initially at the loading interface 207, a request specifying a new or updated data table (or multiple tables) to load into a table-level database system ("Kodiak") may be received in operation 301. The multiple stages of the loading process (as described below) can be handled in asynchronously, in parallel or consecutively, and may involve the same or different loading clients, loading processes, loading interfaces, instances and instance processes.

A loading request, which is received by the loading interface 207, may contain any suitable parameters for the tables to be loaded (referred to as the "golden state" data tables) and for which the loading interface (e.g., API) is configured to recognize and process. By way of example, a loading request may specify a data table's schema, location (such as specification of the cache file in DFS 204 from the table is to be loaded), and table name. In effect, a client 225 requests that the loading interface 207 or API load a specified data table having a specified schema from a specified location into the Kodiak system.

Other information may be provided in the loading request. By way of examples, the loading request for each data table may contain a replication indicator to specify replication parameters (whether to replicate the table and/or the number of data table replications), sharding parameters (whether the data table is to be broken into shards and/or how many shards to form from the data table), version information, etc.

In response to a particular request, the loading interface 207 creates a metadata record (or multiple records) for the new or updated datable to be loaded into one or more specified instances in the metadata store 202 (in the table-level database system 200) in operation 302. These metadata records may include any suitable metadata, such as a portion of the metadata that is received in the loading requests (e.g., table location, table name, table schema, version number, replication and/or shard information, etc.) and/or metadata that is determined or obtained by the loading interface, which was not provided in the load request (e.g., replication information, shard information, etc.).

The metadata records also represent mappings between particular tables and particular Kodiak machines or instances, e.g., 206a~206c. In general, each mapping can represent an assignment for a given Kodiak machine to load a specific cache table. For instance, each record associates a particular table's metadata with a particular instance's identifier.

FIG. 4A represents example records for holding metadata for data tables that are to be loaded in a metadata store structure 400 in accordance with a specific embodiment of the present invention. As shown, each record for each table may include the following fields: a table name, location, schema, metrics, shard, version, and instance identifier (ID). For example, the first record has metadata for a data table having a name "Table1", location "Loc1", and schema "S1". Each table location can be a directory path on a particular DFS machine. For instance, the table location may correspond to a specific file path on a particular HDFS node. The schema, of course, specifies the structure of the table, such as column fields, etc.

The metrics field for each table record may specify various table metrics, such as table size, table query frequency, average query response time (for corresponding instance), data updated timestamp, etc. The shard field may specify the number of shards, and the version field specifies the table version. For example, the version number is incremented each time the table is updated for example by a data processing pipeline. The Instance ID specifies which Kodiak instance is to load the corresponding table. Replication can be specified by having multiple instances assigned to the same table. In the illustrated example, table_X is assigned to be loaded into both instance 206a and 206b. Metrics that pertain to a particular table, regardless of instance assignment, may be duplicated across multiple records (one for each assigned instance). Alternatively, certain metrics (such as table query frequency) may be stored separately from the instance assignment records. For instance, table records can be maintained that associate table identifiers with table metrics, such as query frequency, etc.

Additionally, each Kodiak instance may periodically provide status indicators to the metadata store 202 in operation 322. The instance status indicators for each instance may contain one or more of the following: available disk space size or percentage, CPU usage, a location of the Kodiak instances (e.g., location of the Kodiak server or data center), schema of the Kodiak instance, username of the Kodiak instance, etc. FIG. 4B illustrates metadata for a plurality of instances in accordance with one embodiment of the present invention. In a specific implementation, an ephemeral node is maintained for each instance so that liveness can be effectively indicated by the absence or presence of such data for a particular instance. As shown, each instance node or record may contain an identifier (e.g., 206a) and information pertaining to the instance's capabilities for loading data, such as available disk space size or percentage (e.g., Size1), CPU usage (e.g., CPU1), etc. The instance ID may specify instance location or data center location information, as well as an instance name/ID. At least a portion of instance status indicators may be used during a new or updated data table loading process to determine assignment of tables to specific instances as further described herein.

Additionally, when an instance's usage goes above a particular threshold (e.g., low disk space) or reaches maximum capacity, an alarm may be triggered. This alarm may cause the loading interface to offload tables from the overloaded instance by deleting records for such instance. The loading interface may remove tables for a particular instance for any suitable reason, such as redistribution or in response to a client deleting a particular table.

The loading interface 207 can determine which Kodiak instances are assigned to each data table in any suitable manner. For example, a simple greedy distribution scheme may be used to assign mapping of data tables to Kodiak instances with the most available disk space. Other metrics may be used to assign data tables to particular Kodiak instances. Example metrics may include one or more of the following: available disk space size or percentage, CPU usage, a location of the Kodiak instances (e.g., location of the Kodiak server or data center), schema of the Kodiak instances, username of the Kodiak instances, etc.

Data loaded into Kodiak may also be automatically replicated by the loading API based on information provided in the loading query or other factors as described further below. This loading interface may specify replication for a table in the data table's particular metadata record. Hence, replication can be transparent to the application that loads to the Kodiak system 200. In one contextual application, the input data tables loaded into Kodiak are immutable (which is usually the case for batch processing). Hence, replication is done at the table level. The loading interface can assign how many replicas each data table should have and where the data table should be replicated. Of course, replication can be specified in a loading request from a client.

Any suitable policy can be used to distribute replicated data. A stable policy will generally try to load a data table to the machines where the previous version of the same data table is located. A greedy policy will generally strive to load a data table to instances/machines with the most space.

Given the large number and variety of tables, the Kodiak system 200 can be generally configured to customize the number of table replicas (replication factor) with the importance of the table and the free space of the system. If there is enough space, all the tables can be replicated across all the Kodiak instances. Thus, when a query is made, any Kodiak instance can replay the results such that the response time will be minimal. That is, the client can receive the results from the quickest instance.

However, there may not be enough space to always replicate all tables across all instances. Thus, the loading interface may implement a replication policy for determining how to distribute tables across selected Kodiak instances. In a specific implementation, the most frequently accessed tables are replicated more often than the rarely used ones. As described further herein, the loading instance may also store query metadata metrics for the data tables in metadata store 202. This way, a larger number of Kodiak instances are available to share a heavy query load. In other examples, a loading client can define the replication factor for each particular table. However, Kodiak can determine a replication factor based on the frequency at which a certain cache type or table is updated. In an on-line advertising reporting pipeline, frequently updated caches typically represent the most recent data and are most frequently accessed. For such caches, the loading interface can employ a replication factor that is proportion to the query frequency of the table. Suppose $Rf(T)$ is the replication factor for table T, and $Q(T)$ is the query frequency for table T. Thus, the following relationship can be used:

$$Rf(T)=f(Q(T)) \quad (1)$$

Based on equation (1), the replication factor of a table T is dependent on the query frequency. The function $f(\ )$ can be estimated so as to minimize the query response time.

On another hand, the replication factor also can depend on the available free space. Suppose the total space of the Kodiak system is $S_{total}$, and the size of table T is $S(T)$. Thus, the free space ratio $F_r$ can be estimated by the following.

$$Fr = 1 - \frac{\sum_T (Rf(T(S(T)))}{S_{total}} \quad (2)$$

From the above equations, with higher replication factor $Rf(T)$, the query performance will be improved, however, the free space will decrease. Thus, we have to estimate the optimal $Rf(T)$ considering query performance and free space. If we have the query distribution and free space limitation, then we can estimate the value of $Rf(T)$. For example, in simple, suppose all the tables have even query distribution. Thus, we can assume $Rf(T)$ is a constant number c. Therefore, $$Fr = 1 - \frac{\sum_T (cS(T))}{S_{total}} \quad (3)$$

$$c = \frac{(1-Fr)S_{total}}{\sum_T S(T)}$$

Suppose, Fr=30% and total table size $\sum_T S(T)=0.2 S_{total}$. Thus, c=(1-30%)(1/0.2)=3.5, and 4 can be used as the replication factor for this example.

Based on the metadata store records, each of the one or more specified instances loads the new or updated data table in operation 304. Each Kodiak instance interprets the metadata mapping (as accessed in the metadata store) as the "golden state." Additionally, each metadata mapping (also referred to herein as a "record" or "node") is an assignment for a given Kodiak machine to load a specific cache table. Each Kodiak agent can asynchronously poll the golden state to learn about new or updated tables to load. Each Kodiak instance can then asynchronously load new or updated tables, which were assigned thereto, into its corresponding Kodiak instance. Alternatively, the loading interface can let each Kodiak agent know about new or updated tables that are assigned to such Kodiak instance. One advantage of an asynchronous loading process is that the multiple replicas and tables can be loaded in parallel, speeding up the time to load into the Kodiak system. In case of failures, each Kodiak instance's agent may automatically load its HDFS cache table so as to be local to its local MySQL instance.

In a specific implementation, file access for the HDFS framework can be achieved through the native Java API, the Thrift API to generate a client in the language of the users' choosing (C++, Java, Python, PHP, Ruby, Erlang, Perl, Haskell, C#, Cocoa, Smalltalk, and OCaml), the command-line interface, browsed through the HDFS-UI web app over HTTP, or via 3rd-party network client libraries.

Each Kodiak agent is generally configured to load and drop tables based on the table mappings in the golden state metadata store 202. Adding or dropping a record node corresponds to a Kodiak agent adding or dropping a table. For instance, a Kodiak agent may determine that a particular table has been updated if the version number has increased, as compared to the particular table that is already loaded into the instance. The Kodiak agent may also determine that a table is to be deleted if the corresponding record is deleted in the metadata store 202. A Kodiak component (e.g., loading interface or agent) may also initiate deletion of a particular table by marking the corresponding record in the metadata store 202. As shown, the table "Table) 1" of FIG. 4A is marked as deleted via a "Del" field or flag having a "Y" value. The other tables are not marked for deletion (e.g., via an "N" value in the Del field). A table update may also include marking the previous version of the table as deleted after a record for the new version table is added to the metadata store 202. This way, a query server (e.g., 227) can recognize a deleted table in real time without having to wait for the Kodiak instance to drop the table.

Tables may be loaded into the RDBMS instance, for example, on the same machine. After each specified Kodiak instance loads its new or updated table, the Kodiak instance (e.g., via the agent) may then publish the loaded table with respect to the metadata store as a resource in operation 306.

Each Kodiak instance may publish metadata pertaining to loaded tables in any suitable manner. For instance, the Kodiak instance may write a "Resource" value into a "Load Status" field of its corresponding table record, such as the records of FIG. 4A. In another implementation, the Kodiak instance forms a separate record for each loaded table in the metadata store 202, which preferably maintains a single "write" owner for each metadata record. These "instance" table records may be provided asynchronously with respect to other status indicators pertaining to the instance's operation metrics, such as memory and CPU usage, as well as load records provided by the loading interface.

FIG. 4C represents example records for holding metadata for data tables that have been loaded by an instance and are available for queries in accordance with a specific embodiment of the present invention. As shown, each record contains the cache table type, instance ID (onto which table is loaded), table name, metrics, shard information, version number, and loaded field. A value of "Resource" in the loaded field indicates that the corresponding table for that instance is available for a query. Examples of table types may include normal table type, time series table type, shard table type, etc. Examples of table metrics may include start time for loading a table, ending time for loading a table, duration of load time, table loading error log, etc. The instance table record may also include the table's schema. However, query clients may have knowledge of particular table types and schema and such information need not be presented in the metadata store 202.

Figure 5:
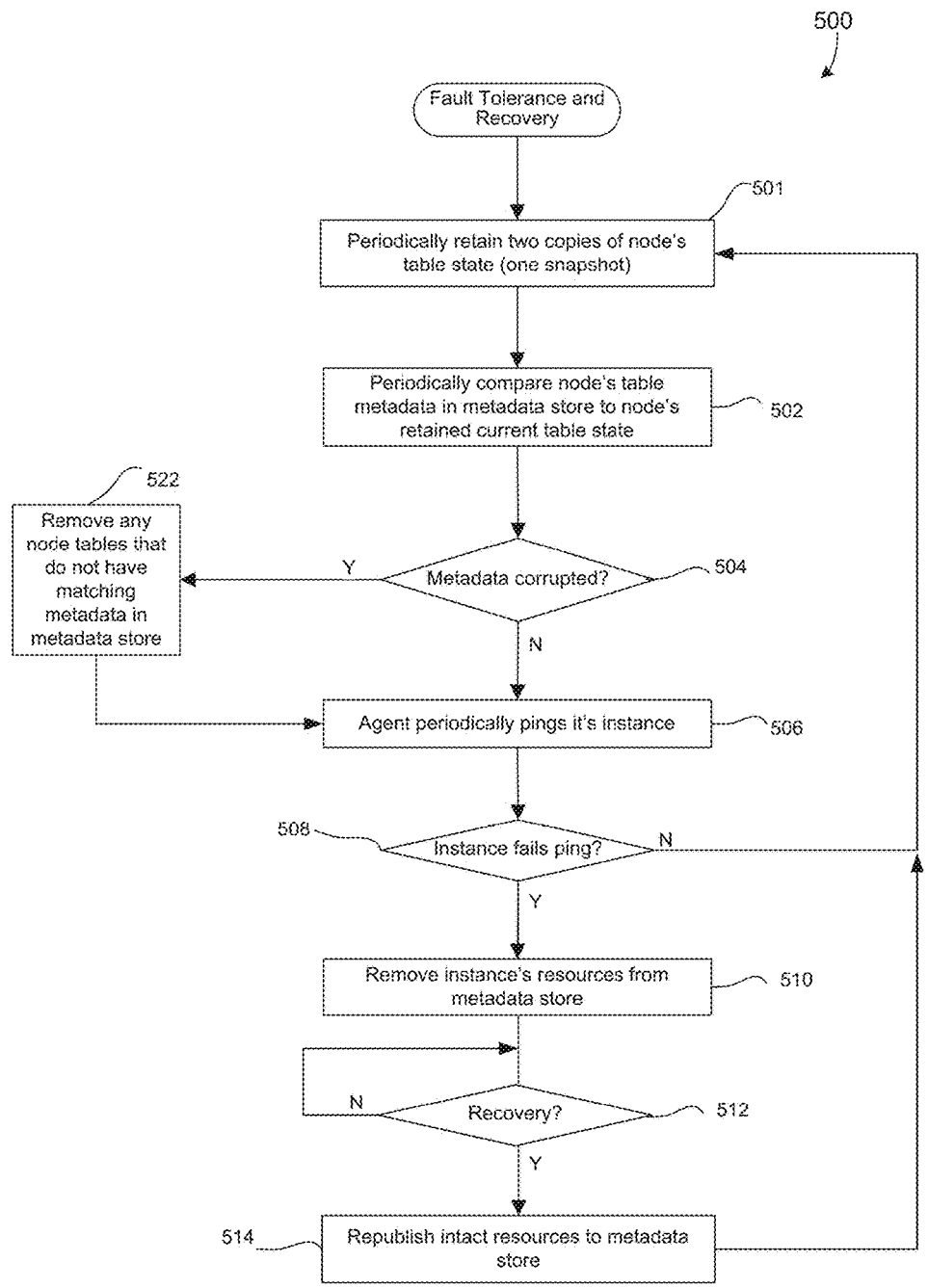
FIG. 5 is a flow chart that illustrates a failure tolerance and recovery process in accordance with specific implementations of the present invention.

Each Kodiak agent may also be configured to gracefully handle failures and automatically retry loading until such loading is successful. FIG. 5 is a flow chart that illustrates a failure tolerance and recovery process 500 in accordance with specific implementations of the present invention. This process 500 is described for a particular Kodiak node although such process may be running on each Kodiak node. As shown, two copies of the node's table state may be periodically retained in operation 501. For example, the Kodiak agent maintains a most up-to-date state of its instance's tables, while storing a snapshot of this state offloaded to the metadata store 202. This snapshot can be used as a baseline for failure recovery. For instance, when a Kodiak server starts its Kodiak agent, this agent can check its Kodiak instance database for validity of all of the loaded resources as specified in the metadata snapshot. Each checked resource (or table) will also be presumably already published in the metadata store 202.

There can be multiple kinds of errors that the Kodiak system can manage: data loading failure, database failure (e.g., a process is dead or not responsive), and node failure and network partition error. These errors can be classified into two categories. The first category is not recoverable. The second category is recoverable later, either with manual or automatic intervention.

Errors of the first category occur mostly when database loading has failed due to data source failure or database data being corrupted. When these errors are encountered, a Kodiak agent may report an error log in its corresponding assigned table metrics (e.g., operation 306 of FIG. 3).

The agent may also try to clean up these dirty states. In the illustrated example, the agent may compare the node's table metadata in the metadata store to the node's retained current table state in operation 502. It may then be determined whether the metadata for the node is corrupted in operation 504. For example, the instance may have tables that do not have corresponding metadata because such metadata has become corrupted. If metadata for a Kodiak node is determined to be corrupted, the agent may remove any node tables that do not have matching metadata in the metadata store in operation 522 as a cleanup process.

The other categories of error could recover later, either automatically or with human intervention. Examples of these failures may include Kodiak agent failure, node failure, database process failure, metadata failure, etc. In a recoverable error case, the actual data and metadata are not corrupted, but the database instance may not be currently accessible. For example, the Kodiak agent may periodically ping its instance in operation 506. It may then be determined whether the Kodiak agent has failed to ping the instance in operation 508. If the instance ping has failed, the agent can then remove all the instance's resources that have been published from the metadata store in operation 510. For example, the "resource" flag can be removed. If the ping succeeds, various operations of the process 500 may be repeated (e.g., pinging, snapshotting, etc.).

If a ping has failed, it may be periodically determined whether the instance database has recovered in operation 512. Once the database process is revived, either by human or automatic service, the Kodiak agent can then check the validity of loaded resources and republish those that are intact in operation 514. Note that the removal of a published resource will likely trigger a Query client to rebuild its resource data structure, which will prevent the non-reachable database instance from being used for that resource, for example, as an instant node for such resource (FIG. 4B). Using ephemeral Zookeeper nodes to identify live Kodiak instances may facilitate this rebuild process.

Figure 6:
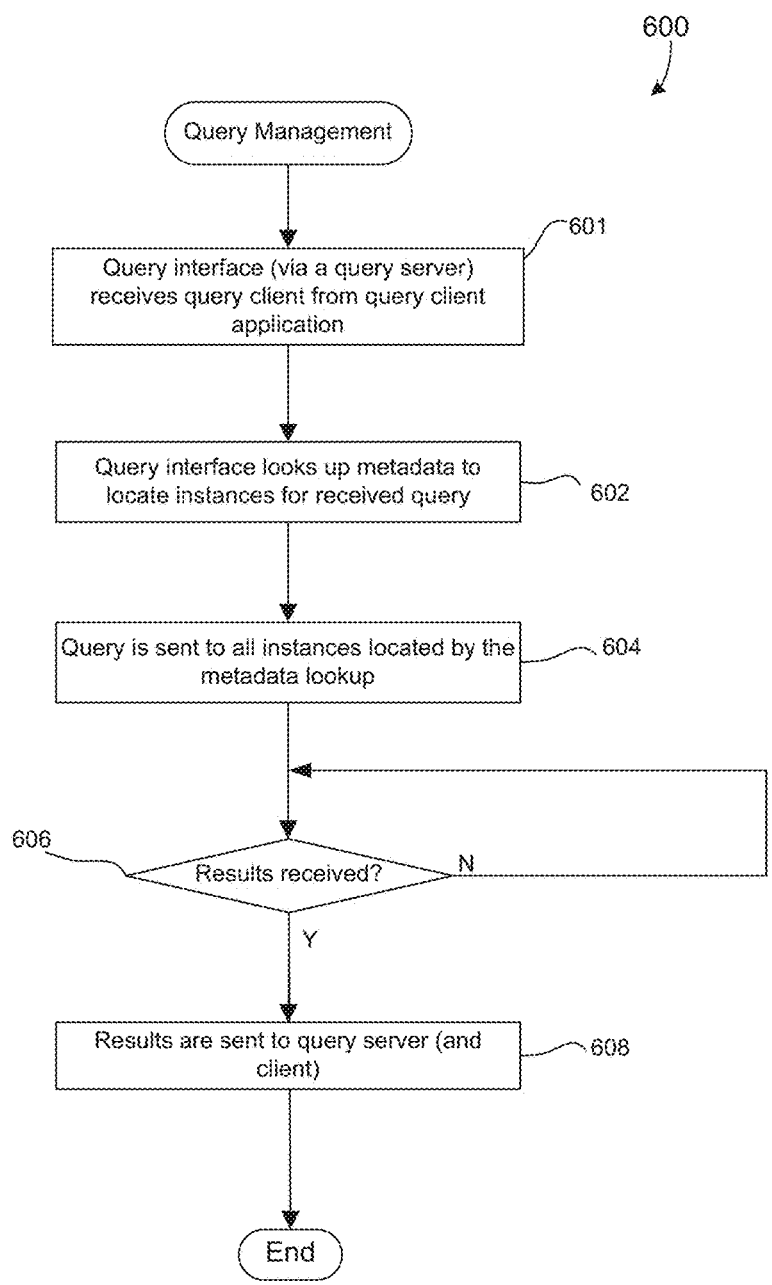
FIG. 6 is a flow chart illustrating a query management process in accordance with one embodiment of the present invention.

Once a resource is published, it becomes visible to the query server (e.g., 227). The query server may be implemented or configurable to reveal particular resources to particular query client applications. FIG. 6 is a flow chart illustrating a query management process 600 in accordance with one embodiment of the present invention. A query interface (e.g., 218) via a query server (e.g., 227) may initially receive a query from a client application in operation 601. In response, the query interface may look up the metadata to locate the Kodiak instances for the received query in operation 602. The query may then be sent (by query interface) to all instances located by the metadata lookup in operation 604. Then, the instances containing the queried tables, including replicated tables, may run the query in parallel.

It may then be determined whether results are received from any instance in operation 606. If not, the process 600 may continue to wait to receive results (at the query interface). If the results are received from any one instance, the query interface may reply to the query server immediately. That is, the results are sent to the query server (and query client) in operation 608. Thus, the query server will not need to wait for all the instances to get the results, but can received the query results from the most responsive instance. Therefore, this strategy can significantly improve the query performance.

If query tables are queried in parallel, the response time may likely be reduced if there are more replicated tables (as compared to fewer replicated tables) since the results are more likely to be received from a relatively fast instance. In a simple example, there are three instances having three different response speeds for providing query results. If a table is replicated on all three instances, the fastest instance will likely provide the results first so that the results are obtained by the query client in the fastest time. In contrast, if the table is only available from the slowest instance, the query client will merely receive query results at the slowest instant's speed. Thus, the replication factor for loading tables may be efficiently based on the statistics of queries for particular tables as described above such that a higher replication factor may be determined for more frequently queried tables, as compared to less frequently queried tables as described above.

If the queries involve more than one relation (e.g., a join), then the querying time may be costly with respect to processing or memory resources that are used by the Kodiak system. Particular computations are also repeated in multiple queries and sometimes can be predicted to be repeated in the future. In this case, the computation is preferably pushed (when feasible) to other servers that are located outside the Kodiak system to improve the Kodiak system's performance.

In certain situations, a query computation may be pushed to a computation server (e.g., 225) that is outside the Kodiak system 201. An external computation server may be used when a multi-relation query (e.g., join/product/intersection/difference) is predefined or predicted. For example, if a lot of queries pertain to a join of table A and table B are received and handled, a join computation on tables A and B can be performed by a computation server. Table A and table B can first be populated in a computation server, and a joined table C can then be populated and stored. That is, table C is the joined result of A and B. Thus, a subsequent query can go to table C directly and not have to join A and B on the fly. This approach is referred to as a predefined or predicted user case.

In certain use cases, advertisers may want to know how well their campaign(s) or sub-campaign(s) are performing on certain domains and subdomains. In other use cases, data providers may wish to see how much a particular user segment is being used by different advertisers. In both cases, joined data for certain frequently queried join results may be precomputed, instead of joining on the fly, to reduce latency. For instance, joins on different hierarchies of performance data may be precomputed. Examples of hierarchies from which data may be joined may include advertiser (advertiser, campaign and creative), publisher (domain, subdomain) and data provider (data provider and user segment). There could be many combinations of interests to query clients/customers. Additionally, clients may wish to perform queries on different date ranges, including long date range time series as described further below, for different combinations of interests. To allow clients to quickly query their desired data, certain data combinations can be pre-extracted using a MapReduce to precompute all of such aggregated reporting data for different date ranges in batches and different combinations of interests.

In a specific example, multiple queries on a particular multi-relation operation (e.g., join Tables A and B) can be received into the query interface 218, which is forwarded to the correct Kodiak instance(s), from which query results may be provided, as further described below. If it is determined that the same particular query is likely to be received in the future based on the statistics that are collected for receiving such a particular query, handling of the multi-relation operation may be pushed to the computation server 225, which can then populate the join/product/intersection/difference data table for the query. The computation output can then be loaded into the Kodiak system. In one embodiment, the computation server 225 may then make a load request to the loading interface, and the computation output or data table output is loaded via any of the above described loading techniques. The query server 227 can determine when the data table output is available in the Kodiak system (via being loaded into one or more Kodiak instances and published). The computation output is then available for subsequent multi-relation queries of the same type. Additionally, common combinations (or joins), such as time series joins as described below, can be pre-computed periodically and stored as new "joined" tables that can be readily available to subsequent queries without performance of another join operation.

An external computation server may handle a multi-relation query in any suitable manner so as to offload processing from the Kodiak system. In one embodiment, a query computation may be performed with respect to data tables in their location outside of Kodiak 201. In another example, a multi-relation Kodiak query may be converted to a language that is supported by the database system at which the data tables are externally stored outside Kodiak. In the illustrated embodiment, the query is an SQL type query, and the data tables are stored in a Hadoop DFS. In this example, the SQL multi-relation query is converted into a MapReduce operation on the DFS data table.

Figure 7:
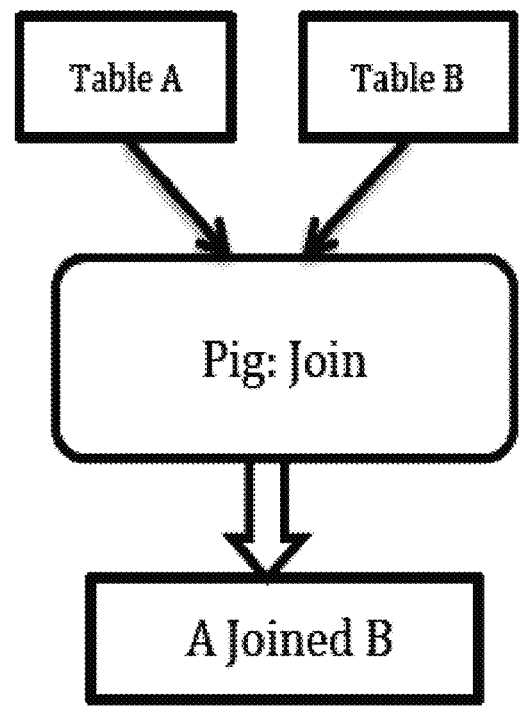
FIG. 7 shows utilization of Pig to implement a query join operation on two tables, A and B, in the Apache Hadoop distributed file system, in accordance with one embodiment of the present invention.

In a specific example, it is determined that a join operation on table A and B is has been frequently received by the Kodiak query server/interface, and such query has been determined to likely be received in the future. A query on joining tables A and B may be passed to an external computation server, e.g., 225. FIG. 7 shows utilization of Pig to implement a query join operation on two tables, A and B, in the Apache Hadoop distributed file system (e.g., 204), in accordance with one embodiment of the present invention. Pig is a high-level platform for creating MapReduce operations within the Hadoop DFS. That is, the computation server 225 performs a Pig-created MapReduce operation that results in joining table A and B stored in DFS 204. Of course, other big data techniques may be used to implement a join function, and may correspond to the particular requirements of the file system in which the data table is stored. After the join result is returned from the DFS, this result may then be loaded into Kodiak. The query server/interface can then initiate a simple query for this join result, which is in the form of a joined table, from the Kodiak system while avoiding the costly join computation from having to be performed in the Kodiak system to thereby improve the performance of the Kodiak system.

In other non-defined cases, a multi-relation query's results can be obtained by a Kodiak component. A Kodiak component may implement the multi-relation query when there is no precomputed join table available. In one Kodiak computation example, a query on a join of Table A and Table B is initiated. The following strategy can be used, and this strategy can also be easily extended to other operations, such as Product, Intersection and Difference.

If at least one Kodiak instance contains both Table A and B, an RDBMS join function can be used to compute the join result inside a single Kodiak instance, which then returns the result. In the case in which more than one Kodiak instance contains both Table A and B, the join result may be computed on only one of these Kodiak instances so as to save processing load in the Kodiak system.

In another situation, no Kodiak instance contains both Table A and B. First, the sizes of Table A and B may be checked. If both sizes of A and B together are small enough for the query server, e.g. less than 10 megabytes, a light join computation may be used on the query server. That is, the query server retrieves both Tables A and B, and the query server then performs the join computation on the retrieved tables A and B. Otherwise, the join computation may be pushed into a particular instance (e.g., RDBMS instance), for example, by performing a loading request for loading one of the tables from one instance into the other instance that has the other table. For example, if Table A has the bigger size, Table B data may be loaded into Table A's Kodiak instance so that there exists one Kodiak instance containing both Tables A and B. Therefore, this Kodiak instance can then perform the join function on Tables A and B inside its instance and return the result.

If the query operation is Union All, there is no further computation required. In this case, the Kodiak server can locate the tables A and B and return the results, which is similar to the simple queries as described above. The query server may then combine these results together without any further calculation.

If it is a normal union that removes the duplication, such a union is similar to the previously described Join operation. This normal union computation can be pushed to a computation server if possible. Otherwise, the result can be computed in the query server or a Kodiak instance, depending on the relative data table size.

Full-relation operations, e.g., Grouping, Aggregation, Eliminating, can be run on a particular instance, which returns the results to the query sever.

If the very large tables are being loaded into one single instance, this loading will block other tables from loading. Thus, Kodiak may also implement a sharing strategy for the big size table case so that 'shards' of a big table are distributed among different Kodiak instances. Data loaded to the Kodiak system may be sharded as part of the loading process. The sharding is preferably transparent to the loading and query application. All shards will generally have the same replication factor.

By way of examples, a first resource1 may be located as a whole on two Kodiak instance kn1 and kn2, while another resource3 is sharded between three different instances kn1, kn2, and kn3. The loading interface may determine to shard big tables, for example, that cannot be reasonable stored on a single instance, or based on a shard indication in the load request. For example, the shard may be based on some keys. The following represents Kodiak metadata for resource1 and resource2:

/Kodiak/resource/{key:"resource1", location: "kn1"_}
/Kodiak/resource/{key:"resource1", location: "kn2"_}
/Kodiak/resource/{key:"resource3", shard:0, total_shard: 3, location: "kn1"_}
/Kodiak/resource/{key:"resource3", shard:2, total_shard: 3, location: "kn2"_}
/Kodiak/resource/{key:"resource3", shard:2, total_shard: 3, location: "kn3"_}

Once loaded, query clients can have different choices on how to handle shards. To reduce the table lookup latency, a lookup client may cache the data in memory. A query client may implement different policies for different resources. One policy might consider a single resource query to be complete only after the client has received at least two copies of the resource, while another policy considers a sharded resource to be complete only after every shard has at least one copy loaded. The exact implementation may depend on both fault tolerance requirements and/or business logic. For example, a week worth of data may be made available only after every daily table of that week is loaded.

Figure 8:
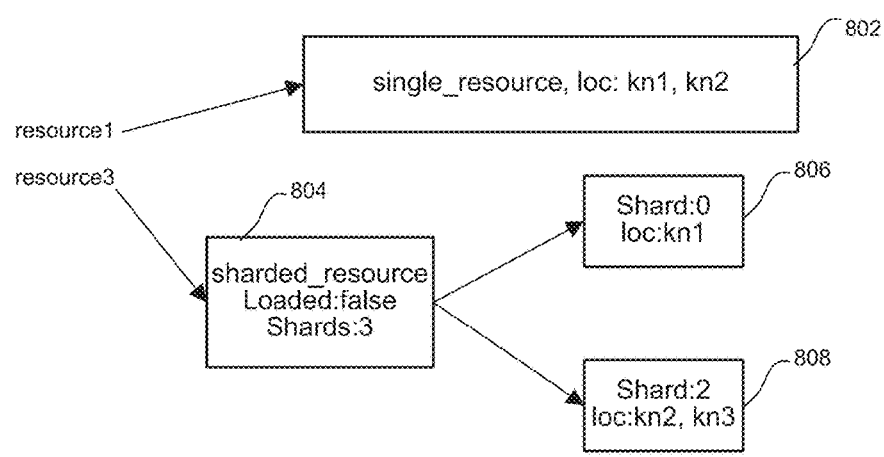
FIG. 8 shows an example data structure for a client, incorporating sharding, in accordance with a specific implementation of the present invention.

FIG. 8 shows an example data structure for a client, incorporating sharding, in accordance with a specific implementation of the present invention. As shown, resource1 is represented as a single resource 802 specifying two locations kn1 and kn2. Resource3 is represented as a sharded resource 804 that is not complete until all shards are present. The data structure also represents the different shards: shard0 located at kn1 and shard2 located at kn2 and kn3.

Whenever a resource is loaded and dropped, a query client may receive a call back from the metadata store. The query client may then rebuild the internal data structure to account for the change. Though it is not shown in FIG. 8, each resource may have a unique resource name and an always increasing version number, which is incremented from the most recently created or modified resource's version. When a resource is recomputed with up-to-date data, this resource will be loaded with a new version. The query client may guarantee to return the latest version of a complete resource.

In some big data user cases, there may be a time series of data that is populated. For example, a time series pipeline for big data management is described in the paper "AntsBoa: A New Time Series Pipeline for Big Data Processing, Analyzing and Querying in Online Advertising Application" by Song et al., 2015 IEEE First International Conference on Big Data Computing Service and Applications, 978-1-4799-8128-1/15, 2015, which paper is incorporated herein by reference in its entirety. Thus, various types of time series data may be produced and loaded into the Kodiak system.

In a general time series data example, there are a group of time series tables, $T_{t1}, T_{t2}, \ldots T_{tn}$, that may be populated in order and loaded into the Kodiak system. Here, the time label satisfies t1<t2< . . . <tn. If one relation of the query is only located on one Kodiak instance, the query strategy may be the same as the above described simple case. The following query strategy is applied to the case in which one relation is located in multiple Kodiak instances. Below, a full relation case, e.g. grouping aggregation operations, is described although the techniques can be easily extended to other operations.

Since time series tables $T_{t1}, T_{t2}, \ldots T_{tn} \ldots$ are populated in order, distribution of the replication tables of $T_{ti}$ may be influenced by the one previous continuous table distribution, $T_{ti-1}$, which is a Markov chain. With a Markov chain, the distribution of $T_{ti}$ is $D(T_{ti})=f(T_{ti-1}))$. Of course, the distribution of $T_{ti}$ can extend to more than one previous table. For example, the distribution of $T_{ti}$ may be based on two previous tables, such that $D(T_{ti})=f_1(D(T_{ti-1}))+f_2(D(T_{ti-2}))$. Alternatively, the distribution may be based on even previous k tables, such as $D(T_{ti})=f_1(D(T_{ti-1}))+f_2(D(T_{ti-2}))+ \ldots f_k(D(T_{ti-k}))$.

From Equation 1 above, the replication factor may be determined to be also related to query frequency. Thus, the distribution of replication tables impacts the performance of queries. In general, a query usually pertains to several continuous tables. Thus, one may assume that there is a high probability to visit only one Kodiak instance to serve a query. For example, one query may query m continuous tables, such as $T_{ti}, T_{ti-1}, \ldots T_{ti+m-1}$. If it assumed that the distribution of one table is only influenced by the previous one, such that $D(T_{ti})=f(D(T_{ti-1}))$, the function $f(\ )$ may be defined so that a percentage p of $T_{ti}$ replication tables has the replication table of $T_{ti+1}$. The rest of the replication tables of $T_{ti+1}$ may be then randomly distributed based on free space. Therefore, there is $pRf(T_{ti})$ including both $T_{ti}$ and $T_{ti+1}$. In the same way, there is $p^{(m-1)}Rf(T_{ti})$ instances that include all $T_{ti}, T_{ti+1}, \ldots$ and $T_{ti+m-1}$. Given a probability, prob, that is bigger than some defined value, e.g. 95%, such probability, prob, can be estimated as follows.

$$\text{prob}=p^{m-1}Rf(T_{ti})\geq\alpha \quad [4]$$

For example, if it assumed that $Rf(T_{ti})$ is the constant value 3, m=4, α=95%. Then $$p \geq \sqrt[3]{\frac{0.95}{3}} = 0.68.$$

In some user cases, a column of a table cannot be directly used by a query server. Such column may be converted to a value. For example, HyperLogLog is widely used in the industry to compute the cardinality. HyperLogLog method records cardinality information as a sketch instead of real value. Thus, sketch can be addable and support the aggregation. Here, the Kodiak system may also support these computational fields. In detail, each table has two copies: one copy has the real value, another copy has the sketch one. If the query is a simple query, the real value copy may be queried and returned in the result as described above in a simple query case. However, if the query includes aggregation, it is not reasonable to add the real values. In this case, the sketch copy may be used, and the sketch may be added up. Then, the sketch is converted to a real value, which may then be returned as the results.

To improve the performance, the Kodiak system may also be operable to dynamically reorganize itself to achieve better results. The Kodiak system may initially use a constant replication factor across all the tables. After a predefined period of time in which meaningful statistics may be obtained, the Kodiak system may collect statistics for the table frequency. The replication factor may then be adjusted at a per table level. For instance, an ad hoc job to analyze the query frequency for each table may be run each day. Based on the analyzed frequency value, the replication factor may be adjusted by Equation 1. The distribution of time series tables may also be estimated as described above.

When tables are deleted, the Kodiak system may be configured to not drop the tables immediately. These deleted tables can be marked as deleted in the metadata store. These tables can then be physically deleted when a space reorganization process is triggered. The reorganization process may be triggered every day, every month, or when the free space reaches some defined limitation or threshold. The trigger time may be defined based the particular application.

The storage unit of Kodiak may not be equal to the query unit. For example, a group of $T_{t1}$, $T_{t2}$, ... $T_{tn}$ tables may be loaded. When these time series tables are queried, multiple tables may be queried. Every day, an ad hoc job may also be executed to analyze how many tables for each query. If there is a high probability that some tables are queried at the same time, these small tables may be combined into one big table within the Kodiak system to improve the query performance. For example, most of queries tend to visit two month data. Each month, a table may be loaded into Kodiak. In this case, if one Kodiak instance has two continuous month data tables, it is better to combine them into one table for better performance. Such a data reorganization process can be triggered at a given time e.g. once a month, or as needed.

The data tables described above may include any type of data. In an online advertising system, tables may include user profile data pertaining to any characteristics that were, are, or can be associated with a particular user. To protect a user's privacy, user profile data may be stored with an anonymized type of user identifier, such as an arbitrary or randomized identity, rather than the user's actual name, specific residency, or any other type of user identifying information. Examples of user profile data for the particular anonymized user u may include descriptive data, such as personal or professional interests, employment status, home ownership, knowledge of languages, age, education level, gender, race and/or ethnicity, income, marital status, religion, size of family, field of expertise, residential location (country, state, DMA, etc.), travel location, or predictive data, such as likelihood to consume content or perform an activity, such as clicking on an ad, visiting a page or purchasing a product or service, in the near future, etc.

The user profile data may also include browsing history information, such as pages visited, amount of time per page viewing, links clicked on, searches performed, actions or interactions taken, amount and type of purchases made, etc. The browsing history information may be expressed using any suitable one or more metrics, such as count, absolute or relative value, average, mean, frequency, time duration, etc. The user profile of user u may also include contextual data, such as where the user is currently located, the weather at such location, current events at such location, etc. For instance, the ad request may include a GPS (global positioning satellite) value or access point location for the user u, and other contextual data may be scraped from other databases, such as a weather or entertainment event web site for such location. The media content profile may identify various characteristics of the web page or ad space or ad placement that is available for purchase, such as one or more content category, ad placement position (e.g., top, side, or bottom of page), ad type (e.g., banner, video, pop-up), brand safety (e.g., absence of alcohol, violence, drugs, competitive brands), page quality (e.g., absence of cluttering images, prominent display of the ad), etc.

Embodiments of the present invention may be implemented in any suitable network systems. The network may take any suitable form, such as a wide area network or Internet and/or one or more local area networks (LAN's). The network may be in the form of a data, mobile, cellular, plain old telephone network (POTN), or any combination thereof. Referring back to FIG. 1, the network 100 may include any suitable number and type of devices, e.g., routers and switches, for forwarding requests from each client to a particular server application, forwarding application results back to the requesting clients, or forwarding data between various servers or processing devices.

Embodiments of the present invention may also be practiced in a wide variety of network environments including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc., or any combination thereof. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

The disclosed techniques of the present invention may be implemented in any suitable combination of software and/or hardware system, such as a web-based server or desktop computer system. An apparatus for implementing one or more portions of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 9:
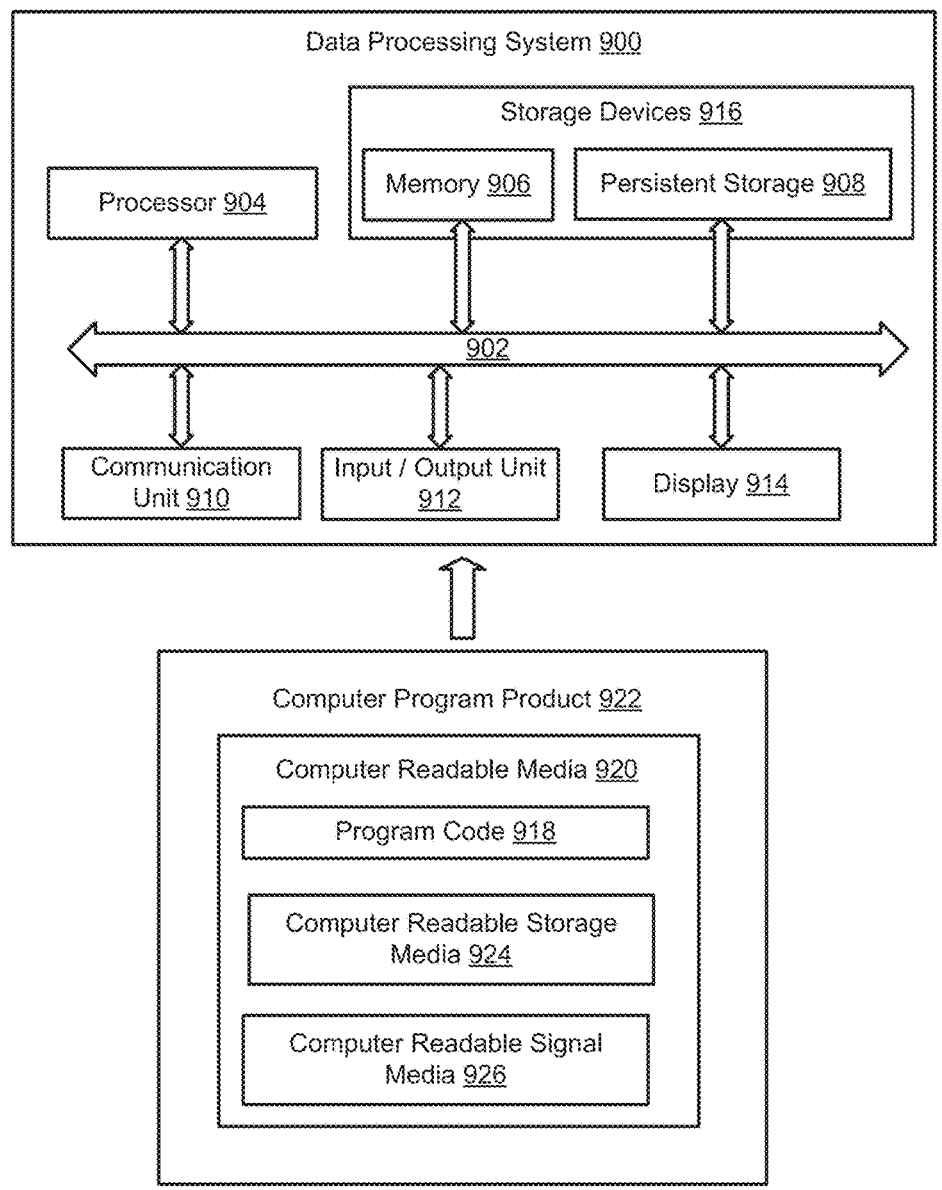
FIG. 9 illustrates a typical computer system that, when appropriately configured or designed, can implement as least portions of the Kodiak table-level process embodiments described herein.

FIG. 9 illustrates a data processing system configured in accordance with some embodiments. Data processing system 900, also referred to herein as a computer system, may be used to implement one or more computers or processing devices used in a controller, server, or other components of systems described above. In some embodiments, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, as may be included in a multi-processor core. In various embodiments, processor unit 904 is specifically configured to process large amounts of data that may be involved when processing data associated with one or more advertisement campaigns or other types of data tables, as discussed above. Thus, processor unit 904 may be an application specific processor that may be implemented as one or more application specific integrated circuits (ASICs) within a processing system. Such specific configuration of processor unit 904 may provide increased efficiency when processing the large amounts of data involved with the previously described systems, devices, and methods. Moreover, in some embodiments, processor unit 904 may be include one or more reprogrammable logic devices, such as field-programmable gate arrays (FPGAs), that may be programmed or specifically configured to optimally perform the previously described processing operations in the context of large and complex data sets sometimes referred to as "big data."

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A table-level database system for managing on-line user data, the table-level database system comprising:
 a loading interface for receiving, from a computational server, a load request specifying a new or updated table to load into the table-level database system, wherein the new or updated table has been populated in a distributed file system, and wherein the load request includes loading parameters including a location in the distributed file system and a schema of the new or updated data table;
 a metadata storage system for storing a plurality of metadata records created by the loading interface, wherein the metadata records include the loading parameters including the location and schema information for the new or updated data table, wherein the metadata records specify a mapping between the new or updated data table and a particular one of a plurality of storage instances in the table-level database system that are to load such new or updated data table, wherein the metadata records are stored as multiple replicas in the metadata storage system;

wherein each particular one of the plurality of storage instances is configured for and includes buffers for loading the new or updated data table from the distributed file system in response to such particular one of the storage instances being mapped to the new or updated data table in at least one of the metadata records, wherein each storage instance includes:
  a local relational database management system (RDMS) instance, and
  an agent for loading or dropping mapped data tables, including the mapped new or updated data table, by periodically and asynchronously polling the metadata storage system to obtain loading parameters for the mapped data tables such that the mapped data tables are loaded in parallel; and and
a query interface configured for:
  receiving, from a query client, a query request with respect to the new or updated data table, and
  forwarding such query requests to each particular storage instance that is mapped by the metadata records to such new or updated data table.

2. The system of claim 1, wherein each storage instance is further configured to publish the load status information for each new or updated data table to the metadata storage system after such new or updated data table is loaded into such storage instance, wherein each query request from the query client pertains to a data table that has corresponding published load status information in the metadata storage system that is accessible by the query client to determine which data table is loaded.

3. The system of claim 2, wherein each storage instance is further configured for
  removing any data tables that are determined by the storage instance to no longer be mapped to such storage instance in the metadata storage system;
  unpublishing, at the metadata storage system, load status information for such storage instance and its mapped data tables when such storage instance's stored data tables are unavailable; and
  republishing any unpublished load status information for such storage instance when the storage instance's stored data tables again become available again after being unavailable and if such stored data tables are determined to be valid.

4. The system of claim 1, wherein the relational database management system (RDMS) instance of each storage instance supports SQL type queries and is atomicity, consistency, isolation, and durability (ACID) compliant.

5. The system of claim 1, wherein each metadata record is owned by or assigned to a single one of the storage instances to avoid write conflicts.

6. The system of claim 1, wherein the location of each new or updated data table specifies a particular file in the distributed file system.

7. The system of claim 1, wherein each load request for a new or updated data table further specifies a version number for such new or updated data table and the loading interface is configured to store such version number within each metadata record for such new or updated data table, and wherein the version number is incremented each time a particular new or updated data table is updated.

8. The system of claim 1, wherein at least some of the metadata records specify a same data table and different storage instances so as to cause replication of such same data table across such different storage instances.

9. The system of claim 1, wherein each storage instance is further configured to store status or operational information, including available memory space, for such storage instance in the metadata storage system, wherein the loading interface is configured to use the status or operational information for each storage instance and a query frequency for each data table so as to determine a replication factor and which storage instances to map to each data table.

10. The system of claim 1, wherein the query interface and storage instances are configured to receive and respond to query requests having a structured query language (SQL) type, transactional, and multi-relation format.

11. The system of claim 1, wherein the query interface is further configured to push a computation for a multi-relation query to a computation server that is outside the table-level distributed database system and to load the computation server's computation results into at least one storage instance from which such query results are obtainable by the query interface for any same multi-relation query that is subsequently received by the query interface.

12. The system of claim 1, wherein the query interface is further configured to cause data tables from different storage instances that are specified in a multi-relation query to be consolidated into a particular one of the different storage instances before performing the multi-relation query on such particular storage instance to produce query results that are sent back to any query client that subsequently sends the multi-relation query to the query interface.

13. A method of managing on-line user data in a table-level distributed database system, comprising:
  receiving, at a loading interface of the table-level distributed database system, a load request from a computational server specifying a new or updated data table to load into the table-level distributed database system, wherein the new or updated data table has been populated in a distribute file system, and wherein the load request includes loading parameters including a location in the distributed file system and a scheme of the new or updated data table;
  creating, by the loading interface, a plurality of metadata records to be stored in a metadata storage system,
    wherein the metadata records include the loading parameters including the location and scheme information for the new or updated data table
    wherein the metadata records specify a mapping between the new or updated data table and a particular one of a plurality of storage instances in the table-level database system that are to load such new or updated data table,
    wherein the metadata records are stored as multiple replicas in the metadata storage system;
  loading, at each particular one of the storage instances, the new or updated data table from the distributed file system in response to such particular one of the storage instances being mapped to the new or updated data table in at least one of the metadata records, wherein each storage instance includes:

a local relational database management system (RDMS) instance, and an agent for loading or dropping mapped data tables, including the mapped new or updated data table, by periodically and asynchronously polling the metadata storage system to obtain loading parameters for the mapped data tables such that the mapped data tables are loaded in parallel; and publishing, by each particular storage instance, the load status information to the metadata records in the metadata storage system, the load status information indicating that loading of the new or updated data table is complete after such new or updated data table's loading is complete so that such new or updated data table can be queried by a query client.

14. The method of claim 13, further comprising:

at a query interface of the table-level distributed database system, receiving a query request with respect to the new or updated data table from a query client;

the query interface querying each particular storage instance that is mapped by the metadata records to such new or updated data table; and when query results are received by a first one of the queried storage instances, sending the received query results to the query client before receiving query results from any of the other queried storage instances.

15. The method of 13, further comprising:

removing the new or updated data table by any one of the storage instances if such storage instance determines that the new or updated data table is no longer mapped to such storage instance in the metadata storage system;

unpublishing, at the metadata storage system, load status information for any one of the storage instances and its mapped new or updated data table when it's unavailable at such storage instance; and republishing any unpublished load status information for the new or updated data table and any one of the storage instances when such storage instance's new or updated data table becomes available again after being unavailable and if such new or updated data table is determined to be valid.

16. The method of claim 13, wherein the new or updated data table is an updated data table, the method further comprising:

by each storage instance, storing status or operational information, including available memory space, for such storage instance in the metadata storage system; and by the loading interface, using the status or operational information for each storage instance and a query frequency for the updated data table to determine a replication factor for which storage instances to map to the updated data table in the metadata storage system.

17. The method of claim 13, wherein the query interface and storage instances are configured to support SQL type queries and be atomicity, consistency, isolation, and durability (ACID) compliant.

18. The method of claim 13, further comprising pushing a computation for a multi-relation query to a computation server that is outside the table-level distributed database system and loading the computation server's computation results into at least one storage instance from which such query results are obtainable by the query interface for any same multi-relation query that is subsequently received by the query interface.

19. The method of claim 13, further comprising consolidating data tables from different storage instances that are specified in a multi-relation query into a particular one of the different storage instances before performing the multi-relation query on such particular storage instance to produce query results that are sent back to any query client that subsequently sends the multi-relation query to the query interface.

20. The method of claim 13, wherein the new or updated data table is an updated data table, and wherein the load request for the updated data table further specifies a version number for such updated data table, and the method further comprising the loading interface storing such version number within each metadata record for such updated data table.

* * * * *

UNITED STATES PATENT AND TRADEMARK OFFICE
CERTIFICATE OF CORRECTION

PATENT NO. : 10,121,169 B2
APPLICATION NO. : 14/856215
DATED : November 6, 2018
INVENTOR(S) : Liu et al.

Page 1 of 1

It is certified that error appears in the above-identified patent and that said Letters Patent is hereby corrected as shown below:

In the Claims

Claim 13, Column 28, Line 45, change "distribute" to -- distributed --.

Claim 13, Column 28, Line 47, change "scheme" to -- schema --.

Signed and Sealed this
Eighth Day of January, 2019

Andrei Iancu
*Director of the United States Patent and Trademark Office*